US012666283B2

(12) United States Patent (10) Patent No.: US 12,666,283 B2
Mathews et al. (45) Date of Patent: Jun. 23, 2026

(54) REAL-TIME, DISTRIBUTED WIRELESS SENSOR NETWORK FOR CELLULAR CONNECTED DEVICES

(71) Applicant: VIAVI Solutions Inc., Chandler, AZ (US)

(72) Inventors: Robin Mathews, Westford, MA (US); Steve Urvik, Colorado Springs, CO (US); Gopi Mohan, Chennai (IN)

(73) Assignee: VIAVI Solutions Inc., Chandler, AZ (US)

( * ) Notice: Subject to any disclaimer, the term of this patent is extended or adjusted under 35 U.S.C. 154(b) by 393 days.

(21) Appl. No.: 18/350,286

(22) Filed: Jul. 11, 2023

(65) Prior Publication Data

US 2024/0064536 A1 Feb. 22, 2024

Related U.S. Application Data

(60) Provisional application No. 63/371,989, filed on Aug. 19, 2022.

(51) Int. Cl.
*H04W 24/04* (2009.01)
*G06N 20/00* (2019.01)
*H04W 84/18* (2009.01)

(52) U.S. Cl.
CPC ............ *H04W 24/04* (2013.01); *G06N 20/00* (2019.01); *H04W 84/18* (2013.01)

(58) Field of Classification Search
CPC ...... H04W 24/04; H04W 84/18; G06N 20/00; H04L 41/0686; H04L 41/5025; H04L 41/042; H04L 41/0661; H04L 41/0894; H04L 43/08; H04L 41/0836; H04L 41/147; H04L 41/40; H04L 41/16
See application file for complete search history.

(56) References Cited

U.S. PATENT DOCUMENTS

| | | | | |
|---|---|---|---|---|
| 10,750,371 | B2 * | 8/2020 | Bogineni | ............ H04L 41/5025 |
| 11,978,555 | B2 * | 5/2024 | Sobol | ...................... H04W 4/38 |
| 12,206,552 | B2 * | 1/2025 | Guim Bernat | ........ G06F 9/5094 |
| 2017/0277800 | A1 * | 9/2017 | Lucas | ...................... G06F 8/40 |

(Continued)

FOREIGN PATENT DOCUMENTS

EP        3454212 A1     3/2019

OTHER PUBLICATIONS

Extended European Search Report for Application No. EP23189522.8, mailed on Dec. 18, 2023, 15 pages.

(Continued)

*Primary Examiner* — Santiago Garcia
(74) *Attorney, Agent, or Firm* — Harrity & Harrity, LLP

(57) ABSTRACT

An device edge may receive a machine learning model, and may receive data from an edge device associated with a RAN. The device edge may process the data, with the machine learning model, to generate edge analytic data associated with the edge device, and may process the edge analytic data, with the machine learning model, to detect a problem or to predict an issue associated with the edge device or a RAN device associated with the edge device. The device edge may provide particular edge analytic data associated with the problem or the issue to a cloud-computing system, and may perform one or more actions based on the problem or the issue associated with the edge device or the RAN device.

20 Claims, 10 Drawing Sheets

(56) References Cited

U.S. PATENT DOCUMENTS

| | | | |
|---|---|---|---|
| 2018/0300124 A1* | 10/2018 | Malladi | G06F 9/542 |
| 2019/0116091 A1* | 4/2019 | Bijavara Aswathanarayana Rao | H04W 4/50 |
| 2019/0392328 A1* | 12/2019 | Gil Bulacio | H04L 67/12 |
| 2020/0196155 A1* | 6/2020 | Bogineni | H04W 48/18 |
| 2020/0327371 A1 | 10/2020 | Sharma et al. | |
| 2021/0097449 A1* | 4/2021 | Chattopadhyay | G06N 20/20 |
| 2021/0133607 A1* | 5/2021 | Stubbs | G06N 20/00 |
| 2022/0141096 A1* | 5/2022 | Chien | H04L 41/0654 |
| | | | 709/223 |
| 2023/0179311 A1* | 6/2023 | Martin | H04W 16/18 |
| | | | 370/329 |
| 2023/0280059 A1* | 9/2023 | Khan | F24F 11/58 |
| | | | 700/276 |
| 2023/0280708 A1* | 9/2023 | Khan | G05B 23/0216 |
| | | | 700/28 |
| 2024/0195687 A1* | 6/2024 | Shrestha | H04L 41/0816 |

OTHER PUBLICATIONS

Shome D., et al., "Federated Learning and Next Generation Wireless Communications: A Survey on Bidirectional Relationship," Transactions on Emerging Telecommunications Technologies, Jan. 2022, 19 pages, XP055899598, Retrieved from the Internet: [URL:https://arxiv.org/pdf/2110.07649.pdf].

* cited by examiner

100

125
Perform one or more actions

Device edge controller

Change a configuration or a parameter of the one of the edge devices based on the problem Change a configuration or a parameter of a device associated with the one of the edge devices based on the problem Apply a changed configuration or a changed parameter to edge devices related to the one of the edge devices Retrain a machine learning model associated with the one of the edge devices Reboot the one of the edge devices or a device associated with the one of the edge devices based on the problem Cause a technician or an autonomous device to be dispatched to service the one of the edge devices or a device associated with the one of the edge devices Deploy centralized intelligence to one or mode edge devices as edge models Retrieve sectional intelligence from one or more edge devices based on policies Correlate RAN and core data against device edge data Apply a trained model to one or more edge devices based on policies Retrain centralized intelligence periodically based on edge device feedback

FIG. 1B

130
Process data from an edge device, with a machine learning model, to generate edge analytic data associated with the edge device Edge analytic data Machine learning model Data Device edge Edge device

100

Change a configuration or a parameter of the edge device based on the problem or the issue Change a configuration or a parameter of a device associated with the edge device based on the problem or the issue Generate an alarm based on the problem or the issue Retrain the machine learning model based on the problem or the issue Reboot the edge device or a device associated with the edge device based on the problem or the issue Cause a technician or an autonomous device to be dispatched to service the edge device or a device associated with the edge device

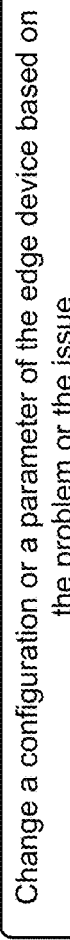

145
Perform one or more actions based on the problem or the issue

Device edge

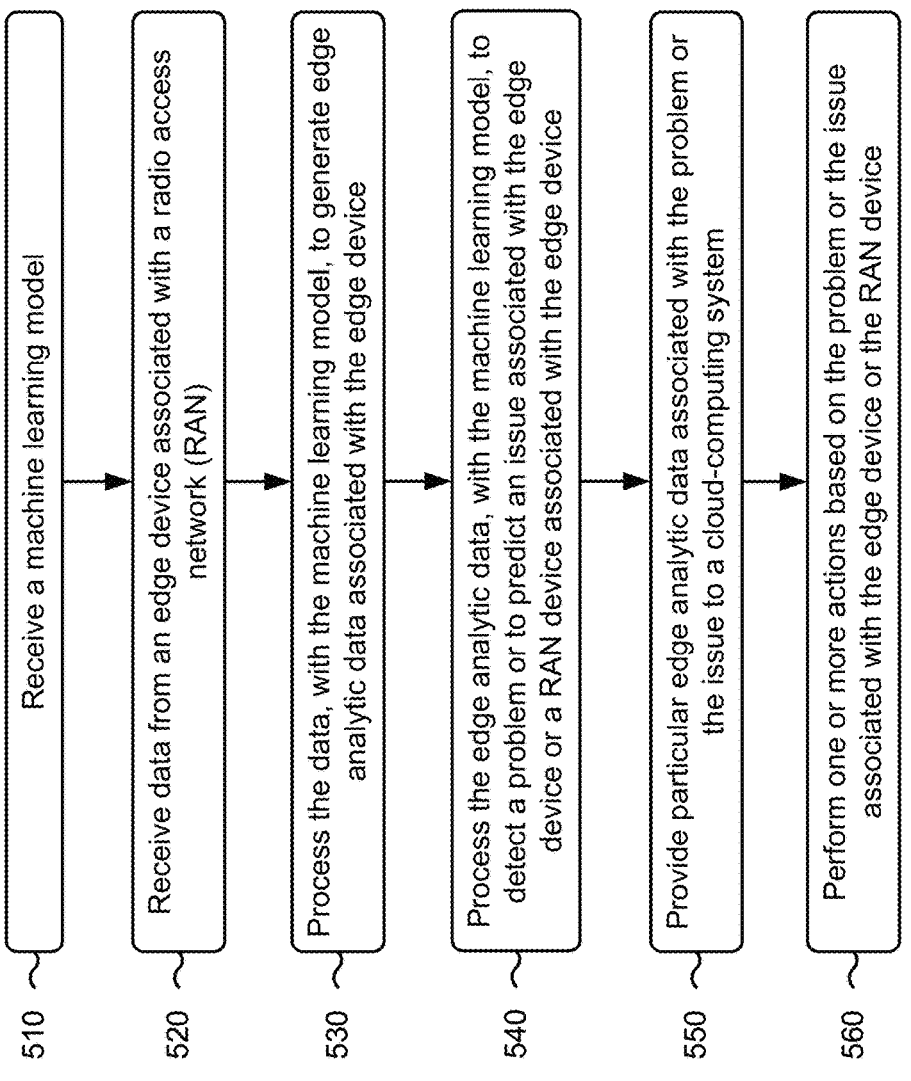

500

510 — Receive a machine learning model

520 — Receive data from an edge device associated with a radio access network (RAN)

530 — Process the data, with the machine learning model, to generate edge analytic data associated with the edge device 540 — Process the edge analytic data, with the machine learning model, to detect a problem or to predict an issue associated with the edge device or a RAN device associated with the edge device 550 — Provide particular edge analytic data associated with the problem or the issue to a cloud-computing system 560 — Perform one or more actions based on the problem or the issue associated with the edge device or the RAN device

FIG. 5

REAL-TIME, DISTRIBUTED WIRELESS SENSOR NETWORK FOR CELLULAR CONNECTED DEVICES

CROSS-REFERENCE TO RELATED APPLICATION

This application claims priority to U.S. Provisional Application No. 63/371,989 entitled "REAL-TIME, DISTRIB-UTED WIRELESS SENSOR NETWORK FOR CELLU-LAR CONNECTED DEVICES," filed on Aug. 19, 2022. The entire content of which is expressly incorporated herein by reference.

BACKGROUND

Internet of Things (IoT) and edge intelligence systems have been implemented using traditional architectures with control in a cloud environment and a software agent on a device that performs intelligent actions related to data col-lection, telemetry, edge actions, and/or the like. These solu-tions rely upon edge devices providing the data needed to make intelligent decisions both at the edge and at a central-ized cloud location, including training of machine learning models that can be deployed in the cloud and/or the edge device. These architectures are one-dimensional because of their reliance of only one source of truth. In a fifth generation (5G) cellular network, an edge device, a radio access net-work (RAN), and a core network form major groups of software and hardware working in tandem.

SUMMARY

Some implementations described herein relate to a method. The method may include receiving a machine learning model, and receiving data from an edge device associated with a radio access network (RAN). The method may include processing the data, with the machine learning model, to generate edge analytic data associated with the edge device, and processing the edge analytic data, with the machine learning model, to detect a problem or to predict an issue associated with the edge device or a RAN device associated with the edge device. The method may include providing particular edge analytic data associated with the problem or the issue to a cloud-computing system, and performing one or more actions based on the problem or the issue associated with the edge device or the RAN device.

Some implementations described herein relate to a device. The device may include one or more memories and one or more processors coupled to the one or more memories. The one or more processors may be configured to receive data from an edge device associated with a RAN, and process the data, with a machine learning model, to generate edge analytic data associated with the edge device. The one or more processors may be configured to process the edge analytic data, with the machine learning model, to detect a problem or to predict an issue associated with the edge device or a RAN device associated with the edge device, and provide particular edge analytic data associated with the problem or the issue to a cloud-computing system. The one or more processors may be configured to perform one or more actions based on the problem or the issue associated with the edge device or the RAN device.

Some implementations described herein relate to a non-transitory computer-readable medium that stores a set of instructions for a device. The set of instructions, when executed by one or more processors of the device, may cause the device to receive a machine learning model, and receive data from an edge device associated with a RAN. The set of instructions, when executed by one or more processors of the device, may cause the device to process the data, with the machine learning model, to generate edge analytic data associated with the edge device, and process the edge analytic data, with the machine learning model, to detect a problem or to predict an issue associated with the edge device or a RAN device associated with the edge device. The set of instructions, when executed by one or more processors of the device, may cause the device to provide particular edge analytic data associated with the problem or the issue to a cloud-computing system, and delete particular edge analytic data unassociated with the problem or the issue. The set of instructions, when executed by one or more processors of the device, may cause the device to perform one or more actions based on the problem or the issue associated with the edge device or the RAN device.

BRIEF DESCRIPTION OF THE DRAWINGS

FIGS. 1A-1F are diagrams of an example implementation described herein.

FIG. 5 is a flowchart of an example process for utilizing a device edge with a machine learning model to detect a problem or a potential issue associated with an edge device.

DETAILED DESCRIPTION

Figure 1A:
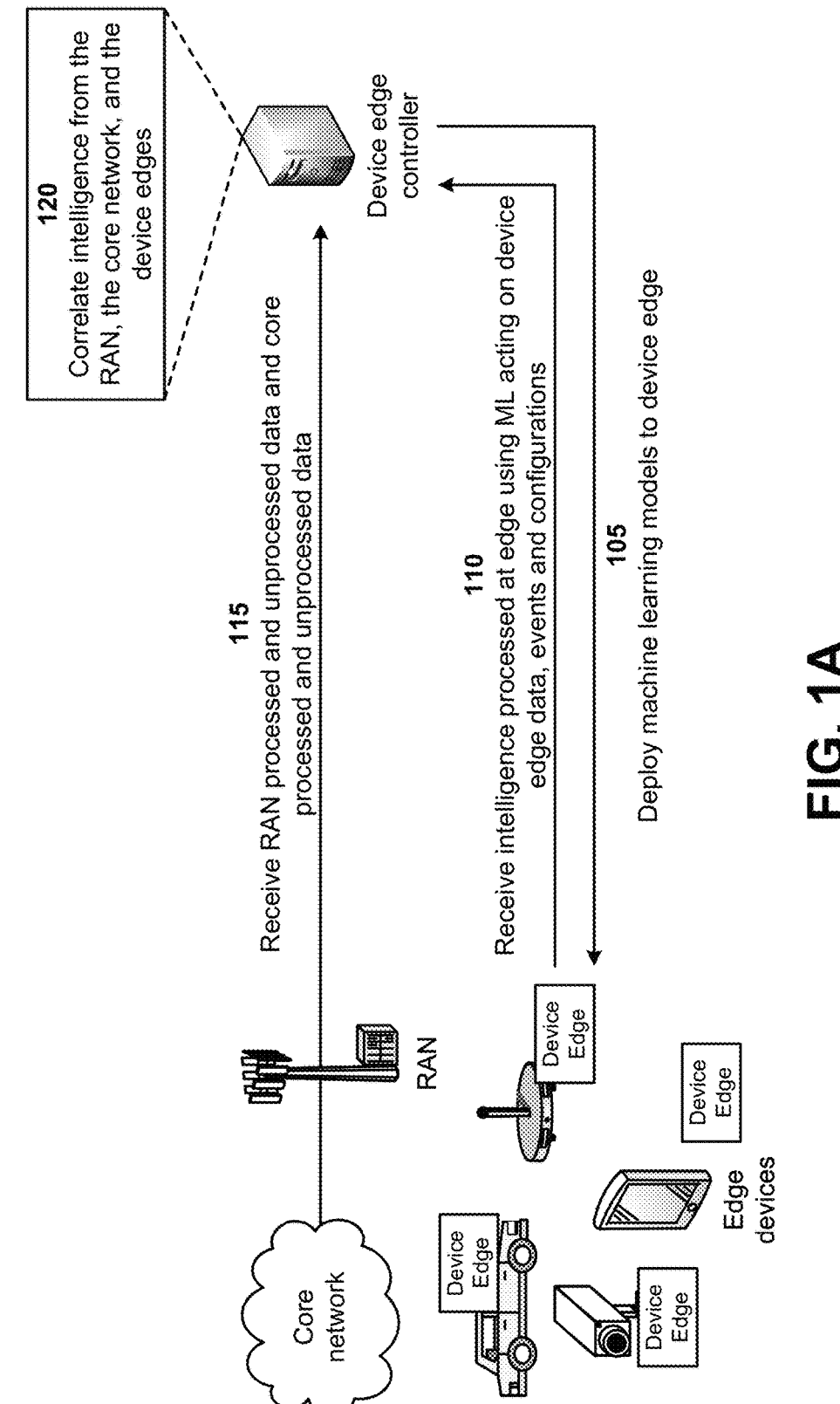

The following detailed description of example implemen-tations refers to the accompanying drawings. The same reference numbers in different drawings may identify the same or similar elements.

A telecommunications network provider is faced with several challenges, such as high customer expectations for network performance and reliability, maintaining a complex telecommunications network, providing tailored user expe-riences for users and user devices, adapting to new types of user devices, and/or the like. Such challenges generate significantly higher costs for the telecommunications net-work provider. The manufacturers of the devices utilized in networks (e.g., a telecommunications network) would be able help the telecommunications network provider reduce such costs if the manufacturers had insight into the opera-tions of the devices. Therefore, current techniques for man-aging networks and devices of networks consume comput-ing resources (e.g., processing resources, memory resources, communication resources, and/or the like), networking resources, and/or the like associated with failing to identify problems or potential issues associated with networks and/or devices of networks, handling network outages caused by the problems or the potential issues, troubleshooting the networks and/or the devices based on the problems or the potential issues, handling poor user experiences caused by the problems or the potential issues, and/or the like.

Some implementations described herein relate to a device edge that utilizes a machine learning model to detect a problem or a potential issue associated with an edge device, a network device, a utilities network, or an IoT device. For example, the device edge may receive a machine learning model, and may receive data from an edge device associated with a RAN. The device edge may process the data, with the machine learning model, to generate edge analytic data associated with the edge device, and may process the edge analytic data, with the machine learning model, to detect a problem or to predict an issue associated with the edge device or a RAN device associated with the edge device. The device edge may provide particular edge analytic data associated with the problem or the issue to a cloud-computing system, and may delete particular edge analytic data unassociated with the problem or the issue. The device edge may perform one or more actions based on the problem or the issue associated with the edge device or the RAN device.

Implementations described herein provide a real-time distributed wireless sensor network platform that combines intelligence from a device edge, a RAN, and a core network in real time to provide visibility into an edge device, and outcomes of actionability, applications, and solutions that are superior to a one-dimensional view of a connected cellular device in a 5G network. Implementations described herein may provide solutions, such as cellular system deep insights, security, advanced targeted advertising, geolocation in the absence of global positioning system (GPS), and/or the like. Implementations described herein may support software device edge runtime and turnkey hardware that embodies a device edge. Implementations described herein enable cross validation of edge intelligence with the RAN and the core network.

In this way, the device edge utilizes a machine learning model to detect a problem or a potential issue associated with an edge device. The device edge may include a programmable, machine learning model-driven device that can be deployed across a geography (e.g., a network) to solve a variety of problems. The device edge may include fourth generation (4G) and fifth generation (5G) hardware that can be provided on or in a structure (e.g., an electric pole, a cell tower, and/or the like), an edge device (e.g., a transformer, a generator, and/or the like), an IoT device (e.g., a sensor, a robot, a meter, and/or the like), and/or the like. The device edge may include embedded software and cloud-based control mechanisms and may deploy new machine learning models. The device edge may utilize the machine learning model to detect problems at a structure, an edge device, an IoT device, and/or the like, and to predict potential issues (e.g., a physical failure of a structure) before the issues occur. This, in turn, conserves computing resources, networking resources, and/or the like that would otherwise have been consumed in failing to identify problems or potential issues associated with networks and/or devices of networks, handling network outages caused by the problems or the potential issues, troubleshooting the networks and/or the devices based on the problems or the potential issues, handling poor user experiences caused by the problems or the potential issues, and/or the like.

FIGS. 1A-1F are diagrams of an example 100 associated with utilizing a device edge with a machine learning model to detect a problem or a potential issue associated with an edge device. As shown in FIGS. 1A-1F, example 100 includes a core network, a radio access network (RAN), edge devices with device edges, and a device edge controller. The edge devices and the device edges may communicate with the core network via the RAN, and may communicate with the device edge controller. In some implementations, the edge devices and the device edges may be utilized to provide transformer temperature monitoring, transformer vibration monitoring, orientation monitoring, engine vibration monitoring (e.g., generators, industrial engines, and/or the like), predictive maintenance based on vibration and acoustic signature, home generator monitoring, turbine monitoring, telecommunications infrastructure monitoring (e.g., cellular tower monitoring for vibration and/or failure), emergency mobile generator monitoring, location tracking, and/or the like. Further details of the core network, the RAN, the edge devices, the device edges, and the device edge controller are provided elsewhere herein.

As shown in FIG. 1A, and by reference number 105, the device edge controller may deploy machine learning models to the device edges. For example, the device edge controller may deploy the same machine learning model to each of the device edges, may deploy different machine learning models to each of the device edges, may deploy the same machine learning model to similar device edges, and/or the like. In some implementations, the machine learning model may include a machine learning model that processes data from an edge device to generate analytic data associated with the edge device.

The device edge may train the machine learning model to generate the edge analytic data associated with the edge device. In some implementations, rather than training the machine learning model, the device edge may obtain the machine learning model from another system or device (e.g., the device edge controller) that trained the machine learning model. In this case, the device edge may provide the other system or device with updated training, validation, and/or test datasets to retrain the machine learning model in order to update the machine learning model.

In some implementations, the machine learning model may include a clustering model. A clustering model may use cluster analysis (also known as clustering) to perform machine learning. Cluster analysis is the task of grouping a set of objects in such a way that objects in the same group (called a cluster) are more similar (in some sense) to each other than to objects in other groups (clusters). Cluster analysis can be achieved by various algorithms that differ significantly in their notion of what constitutes a cluster and how to efficiently find them. Popular notions of clusters include groups with small distances between cluster members, dense areas of the data space, intervals or particular statistical distributions, and/or the like. Different cluster models (with correspondingly different cluster algorithms) may include connectivity models (e.g., where hierarchical clustering builds models based on distance connectivity), centroid models (e.g., where the k-means algorithm represents each cluster by a single mean vector), distribution models (e.g., where clusters are modeled using statistical distributions, such as multivariate normal distributions used by an expectation-maximization algorithm), density models (e.g., where clusters are defined as connected dense regions in the data space), and/or the like.

In some implementations, the device edge may train the machine learning model with a training dataset to generate a trained machine learning model, and may process a validation dataset, with the trained machine learning model, to validate that the trained machine learning model is operating correctly. If the trained machine learning model is operating correctly, the device edge may process the trained machine learning model, with a test dataset, to further ensure that the trained machine learning model is operating correctly. If the trained machine learning model is operating incorrectly, the device edge may modify the trained machine learning model and may revalidate and/or retest the modified machine learning model based on the validation dataset and/or the test dataset.

As further shown in FIG. 1A, and by reference number 110, the device edge controller may receive, via the machine learning models, intelligence processed at the edge devices using the machine learning model acting on edge device data, events, and configurations. For example, the intelligence may be referred to as edge analytic data associated with the edge devices. In some implementations, each of the device edges may receive data from a corresponding edge device, and may process the data, with a machine learning model, to generate analytic data associated with the corresponding edge device. The device edges may provide the edge analytic data associated with the edge devices to the device edge controller and the device edge controller may receive the edge analytic data. In some implementations, the edge analytic data associated with the edge devices may include acceleration data, movement data, pressure data, sound data, vibration data, magnetic data, battery data, location data, temperature data, velocity data, weather data, and/or the like associated with the edge devices. The edge analytic data may not include the raw (e.g., unprocessed) data provided by the edge devices to the device edges. In this way, the device edges may provide security for the raw data received from the edge devices by not transmitting the raw data to the device edge controller (e.g., via an unsecure network).

In some implementations, the device edges may provide, to the device edge controller, only the edge analytic data that satisfies thresholds (e.g., a threshold acceleration, a threshold pressure, a threshold temperature, and/or the like) indicating potential issues with the edge devices, devices of the core network, devices of the RAN, and/or the like. The device edges may discard the edge analytic data not provided to the device edge controller. In this way, the device edges may reduce a quantity of traffic provided by the device edges, via the RAN, to the device edge controller, which conserves processing resources, memory resources, networking resources, and/or the like associated with the edge devices and the device edge controller. In some implementations, the device edge controller may continuously receive the edge analytic data from the device edges, may periodically receive the edge analytic data from the device edges, may receive the edge analytic data based on requests provided to the device edges, and/or the like.

As further shown in FIG. 1A, and by reference number 115, the device edge controller may receive RAN processed (e.g., RAN analytic data) and unprocessed (e.g., raw) data from the RAN and may receive core processed (e.g., core analytic data) and unprocessed (e.g., raw) data from the core network. For example, the core network may generate the core analytic data and the raw data, and may provide the core analytic data and the raw data to the device edge controller. The RAN may generate the RAN analytic data and the raw data, and may provide the RAN analytic data and the raw data to the device edge controller. The device edge controller may receive the core analytic data and the raw data from the core network and may receive the RAN analytic data and the raw data from the RAN. In some implementations, the device edge controller may continuously receive the core analytic data and the raw data from the core network, may periodically receive the core analytic data and the raw data from the core network, may receive the core analytic data and the raw data based on a request provided to the core network, and/or the like. In some implementations, the device edge controller may continuously receive the RAN analytic data and the raw data from the RAN, may periodically receive the RAN analytic data and the raw data from the RAN, may receive the RAN analytic data and the raw data based on a request provided to the RAN, and/or the like.

The core analytic data may include key performance indicators (KPIs) associated with the core network. For example, the core analytic data may include data identifying a serviceability of the core network (e.g., an ability of a service to be obtained from the core network), an accessibility of the core network (e.g., an ability of a user to obtain access to the core network for a service request), a retainability of the core network (e.g., proper retention of connections, and release or disengagement when requested by a user), an integrity of the core network (e.g., a level of reproduction of a transmitted signal at a receiving end), an availability of the core network (e.g., an availability of a service from the core network), a reliability of the core network (e.g., a reliability of a service from the core network), a maintainability of the core network (e.g., a maintainability of a service from the core network, a utilization of the core network (e.g., a utilization of a core network resource, such as throughput on specific interface), and/or the like.

The RAN may communicate with one or more edge devices via signaling. The signaling may include wireless (e.g., radio frequency (RF)) signals transmitted by the RAN to the one or more edge devices, wireless (e.g., RF) signals received by the RAN from the one or more edge devices, wireless signals received by the one or more edge devices from the RAN, wireless signals received by the one or more edge devices from one or more other edge devices, and/or the like. The signaling may enable the RAN to communicate with the one or more edge devices and provide services (e.g., telecommunications services, connections to other networks, and/or the like) to the one or more edge devices. A received strength of a signal between the RAN and an edge device may depend on a proximity of the RAN and the edge device, signal power output of the RAN, signal power output of the edge device, a quantity of obstructions provided between the RAN and the edge device, types of obstructions provided between the RAN and the edge device, the degree of non-line-of-sight propagation between the RAN and the edge device, the degree of constructive and/or destructive interference between different propagation paths at a receiver, and/or the like.

In some implementations, the RAN analytic data may include measurements or KPIs associated with the signaling provided between the RAN and the edge devices in a geographical area (e.g., over a time period). The measurements may include events (e.g., connections, traffic transmission, traffic reception, and/or the like) recorded by performance counters associated with the RAN and/or the edge devices. The KPIs may be calculated based on the measurements (e.g., the recorded events). The KPIs may include bandwidths, throughputs, signal strengths, availability indicators (e.g., percentages of time that the RAN is providing services to the edge devices), network resource indicators (e.g., traffic and control channels provided by the RAN), handover indicators (e.g., a handover of a moving edge device from the RAN to another RAN), voice service indicators, data service indicators, and/or the like. In some implementations, the device edge controller may receive the measurements and/or the signaling from the RAN and/or the edge devices, and may calculate the KPIs based on the measurements and/or the signaling.

As further shown in FIG. 1A, and by reference number 120, the device edge controller may correlate intelligence from the RAN, the core network, and the device edges. For example, the device edge controller may correlate the edge analytic data, the core analytic data, the raw core data, the RAN analytic data, and the RAN raw data. In some implementations, the device edge controller may identify a problem with one of the edge devices based on correlating the edge analytic data, the core analytic data, the raw core data, the RAN analytic data, and the RAN raw data. For example, the device edge controller may analyze the edge analytic data, the core analytic data, the raw core data, the RAN analytic data, and the RAN raw data, and may identify the problem with one of the edge devices based on analyzing the edge analytic data, the core analytic data, the raw core data, the RAN analytic data, and the RAN raw data. In some implementations, the device edge controller may process the edge analytic data, the core analytic data, the raw core data, the RAN analytic data, and the RAN raw data, with a machine learning model, to identify the problem with one of the edge devices. The machine learning model may include a clustering model, as described above. In some implementations, the device edge controller may identify a problem with one or more devices of the core network and/or the RAN based on the core analytic data, the RAN analytic data, and the edge analytic data.

The device edge controller may monitor and detect the problem in real-time and may provide proactive and predictive incident capabilities. For example, the device edge controller may detect (e.g., with high granularity movement and alignment measurements) movement of a cellular tower based on g-force and accurate azimuth, tilt, and roll data. The device edge controller may generate intelligent alarms for the problem and may provide real-time automation and/or reactive inspection of a problem. The identification of the problem may enable the device edge controller to provide greater precision for inspection, maintenance, and ultimately improvement and/or replacement of the edge device and/or the one or more devices of the core network and/or the RAN. The identification of the problem (e.g., via anomaly detection) may enable the device edge controller to proactively address the problem before a more severe incident occurs. For example, the device edge controller may cause power to be disabled for the edge device and/or the one or more devices of the core network and/or the RAN to prevent a severe incident and to improve safety.

As shown in FIG. 1B, and by reference number 125, the device edge controller may perform one or more actions based on the problem. In some implementations, performing the one or more actions includes the device edge controller changing a configuration or a parameter of the one of the edge devices based on the problem. For example, the device edge controller may identify a configuration or a parameter of the edge device that is causing the problem with the edge device. The device edge controller may generate a change for the configuration or the parameter, and may cause the edge device to implement the change for the configuration or the parameter in order to eliminate the problem. In this way, the device edge controller conserves computing resources, networking resources, and/or the like that would otherwise have been consumed in failing to identify problems or potential issues associated with the edge device, handling network outages caused by the problems or the potential issues, and/or the like.

In some implementations, performing the one or more actions includes the device edge controller changing a configuration or a parameter of a device associated with the one of the edge devices based on the problem. For example, the device edge controller may identify a configuration or a parameter of a device associated with the edge device (e.g., a device of the core network or the RAN) that is causing the problem. The device edge controller may generate a change for the configuration or the parameter, and may cause the device of the core network or the RAN to implement the change for the configuration or the parameter in order to eliminate the problem. In this way, the device edge controller conserves computing resources, networking resources, and/or the like that would otherwise have been consumed in troubleshooting the device based on problems or potential issues associated with the device, handling poor user experiences caused by the problems or the potential issues, and/or the like.

In some implementations, performing the one or more actions includes the device edge controller applying a changed configuration or a changed parameter to edge devices related to the one of the edge devices. For example, the device edge controller may identify a configuration or a parameter of the edge device that is causing the problem with the edge device, and may identify edge devices that are similar to the edge device with the problem. The device edge controller may generate a change for the configuration or the parameter, and may cause the similar edge devices to implement the change for the configuration or the parameter in order to eliminate the problem. In this way, the device edge controller conserves computing resources, networking resources, and/or the like that would otherwise have been consumed in failing to identify problems or potential issues associated with the similar edge devices, handling network outages caused by the problems or the potential issues, and/or the like.

In some implementations, performing the one or more actions includes the device edge controller retraining a machine learning model associated with the one of the edge devices. For example, the device edge controller may utilize the problem as additional training data for retraining the machine learning model, thereby increasing the quantity of training data available for training the machine learning model. Accordingly, the device edge controller may conserve computing resources associated with identifying, obtaining, and/or generating historical data for training the machine learning model relative to other systems for identifying, obtaining, and/or generating historical data for training machine learning models.

In some implementations, performing the one or more actions includes the device edge controller rebooting the one of the edge devices or a device associated with the one of the edge devices based on the problem. For example, the device edge controller may determine that the problem with the edge device may be eliminated by rebooting the edge device or a device associated with the edge device (e.g., a device of the core network and/or the RAN). The device edge controller may cause the edge device or the device associated with the edge device to reboot in order to address the problem. In this way, the device edge controller conserves computing resources, networking resources, and/or the like that would otherwise have been consumed in failing to identify problems or potential issues associated with the edge device or the device, handling network outages caused by the problems or the potential issues, and/or the like.

In some implementations, performing the one or more actions includes the device edge controller causing a technician or an autonomous device to be dispatched to service the one of the edge devices or a device associated with the one of the edge devices. For example, the device edge controller may determine that the problem with the edge device or the device associated with the edge device cannot be addressed by the device edge controller. In such situations, the device edge controller may cause a technician or an autonomous device to be dispatched to service the edge device or the device associated with the edge device. In this way, the device edge controller conserves computing resources, networking resources, and/or the like that would otherwise have been consumed in failing to identify problems or potential issues associated with the edge device or the device associated with the edge device, troubleshooting the edge device or the device associated with the edge device based on the problems or the potential issues, and/or the like.

In some implementations, performing the one or more actions includes the device edge controller deploying centralized intelligence to one or mode edge devices as edge models, retrieving sectional intelligence from one or more edge devices based on policies, correlating RAN data and core data against device edge data, applying a trained model to one or more edge devices based on policies, retraining centralized intelligence periodically based on edge device feedback, ingesting the RAN data, transforming the RAN data to RAN intelligence, extracting actionability from RAN intelligence, detecting impacting RAN issues, applying actions to the edge device, providing a feedback loop for automation control, training machine learning models using selective RAN data, ingesting core data, transforming the core data to intelligence, extracting actionability from core intelligence, detecting impacting core issues, applying actions to the edge device, providing a feedback loop for automation control, training machine learning models using selective core data, ingesting edge data, transforming the edge data to intelligence, extracting actionability from edge intelligence, detecting impacting edge issues, applying actions to the edge device, providing a feedback loop for automation control, training machine learning models using selective edge data, and/or the like.

Figure 1C:
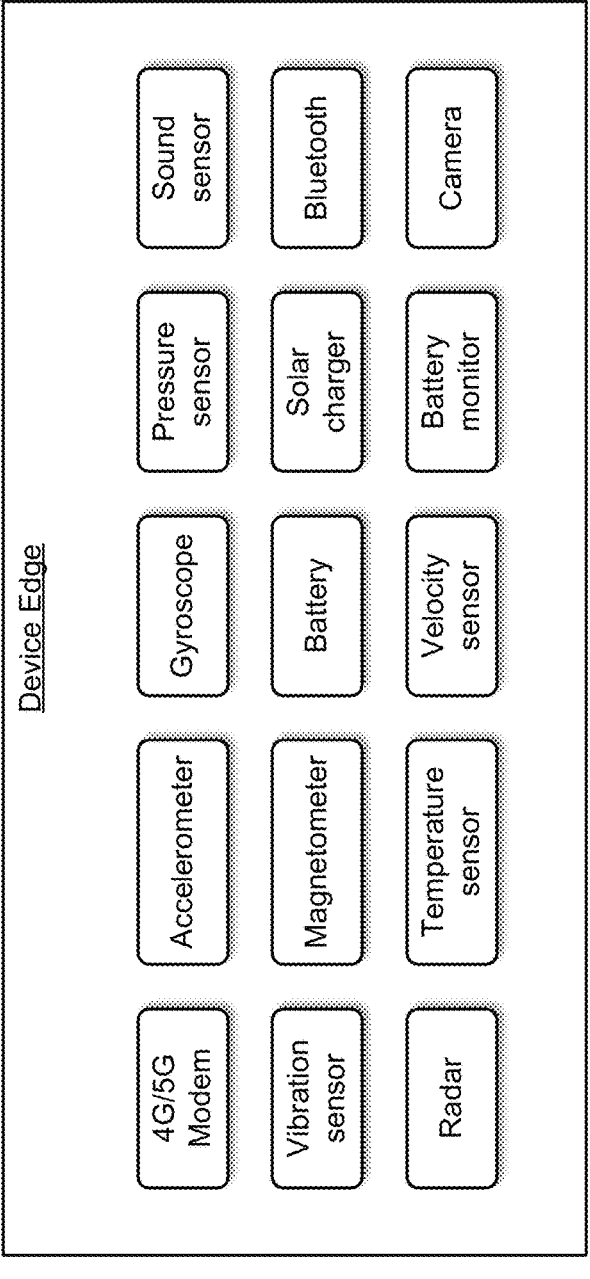

As shown in FIG. 1C, a device edge may include a 4G/5G modem, an accelerometer, a gyroscope, a pressure sensor, a sound sensor, a vibration sensor, a magnetometer, a battery, a solar charger, a Bluetooth component, a radar component, a temperature sensor, a velocity sensor, a battery monitor, a camera, and/or the like. In some implementations, the device edge may include one or more of the 4G/5G modem, the accelerometer, the gyroscope, the pressure sensor, the sound sensor, the vibration sensor, the magnetometer, the battery, the solar charger, the Bluetooth component, the radar component, the temperature sensor, the velocity sensor, the battery monitor, the camera, and/or the like, depending on a desired functionality of the device edge.

The 4G/5G modem may include a 4G and/or a 5G device that converts data from a digital format into a format suitable for an analog transmission medium, such as a telephone or a radio. The 4G/5G modem may transmit data by modulating one or more carrier wave signals into encoded digital information, and may demodulate one or more carrier wave signals to recreate original digital information.

The accelerometer may include a device that measures proper acceleration. Proper acceleration is an acceleration (e.g., a rate of change of velocity) of a body in its own instantaneous rest frame.

The gyroscope may include a device used for measuring or maintaining orientation and angular velocity. A gyroscope may include a spinning wheel or disc in which an axis of rotation (e.g., a spin axis) is free to assume any orientation. When rotating, the orientation of the spin axis may be unaffected by tilting or rotation of a mounting, due to conservation of angular momentum.

The pressure sensor may include a device for pressure measurement (e.g., of gases or liquids). Pressure may include an expression of a force required to stop a fluid from expanding, and may be stated in terms of force per unit area. A pressure sensor may act as a transducer that generates an electrical signal as a function of an imposed pressure.

The sound sensor may include a device that detects sound waves through an intensity of the sound waves and by converting the sound waves to electrical signals. Sound waves may propagate through air molecules and may cause a diaphragm in a microphone of the sound sensor to vibrate. The vibration may result in a capacitance change, and the sound sensor may amplify and digitize the capacitance change for processing of sound intensity.

The vibration sensor may include a device (e.g., a piezoelectric accelerometer) that senses vibration. The vibration sensor may measure fluctuating accelerations, speeds, and/or normal vibrations. The vibration sensor may be utilized to predict maintenance for machinery, to reduce overall costs and increase performance of the machinery, and/or the like.

The magnetometer may include a device that measures a magnetic field or a magnetic dipole moment. Different types of magnetometers may measure a direction, a strength, or a relative change of a magnetic field at a particular location.

The battery may include a device that provides a source of electric power, consisting of one or more electrochemical cells with external connections for powering electrical devices.

The solar charger may include a device that utilizes solar energy to supply electricity to devices or batteries.

The Bluetooth component may include a class of Bluetooth low energy devices (e.g., hardware transmitter) that broadcasts an identifier to nearby portable electronic devices. Bluetooth technology may enable the edge devices to perform actions when in close proximity to the Bluetooth component.

The radar component may include a device that uses radio waves to determine a distance, an angle, and a radial velocity of objects relative to the device edge. The radar component may be utilized to detect aircraft, ships, spacecraft, guided missiles, motor vehicles, weather formations, terrain, and/or the like.

The temperature sensor may include a device that measures a temperature or a temperature gradient. The temperature sensor may include a sensor in which some change occurs with a change in temperature, and a means of converting the change into a numerical value.

The velocity sensor may include a sensor that responds to velocity rather than absolute position. The velocity sensor may generate an output that is proportional to a velocity of a transducer of the velocity sensor.

The battery monitor may include a device that determines and displays a remaining charge of the battery of the device edge.

The camera may include an optical device that captures a visual image. The camera may include a camera body with a small hole (e.g., an aperture) that allows light through to capture an image on a light-sensitive surface (e.g., a digital sensor).

Figure 1D:
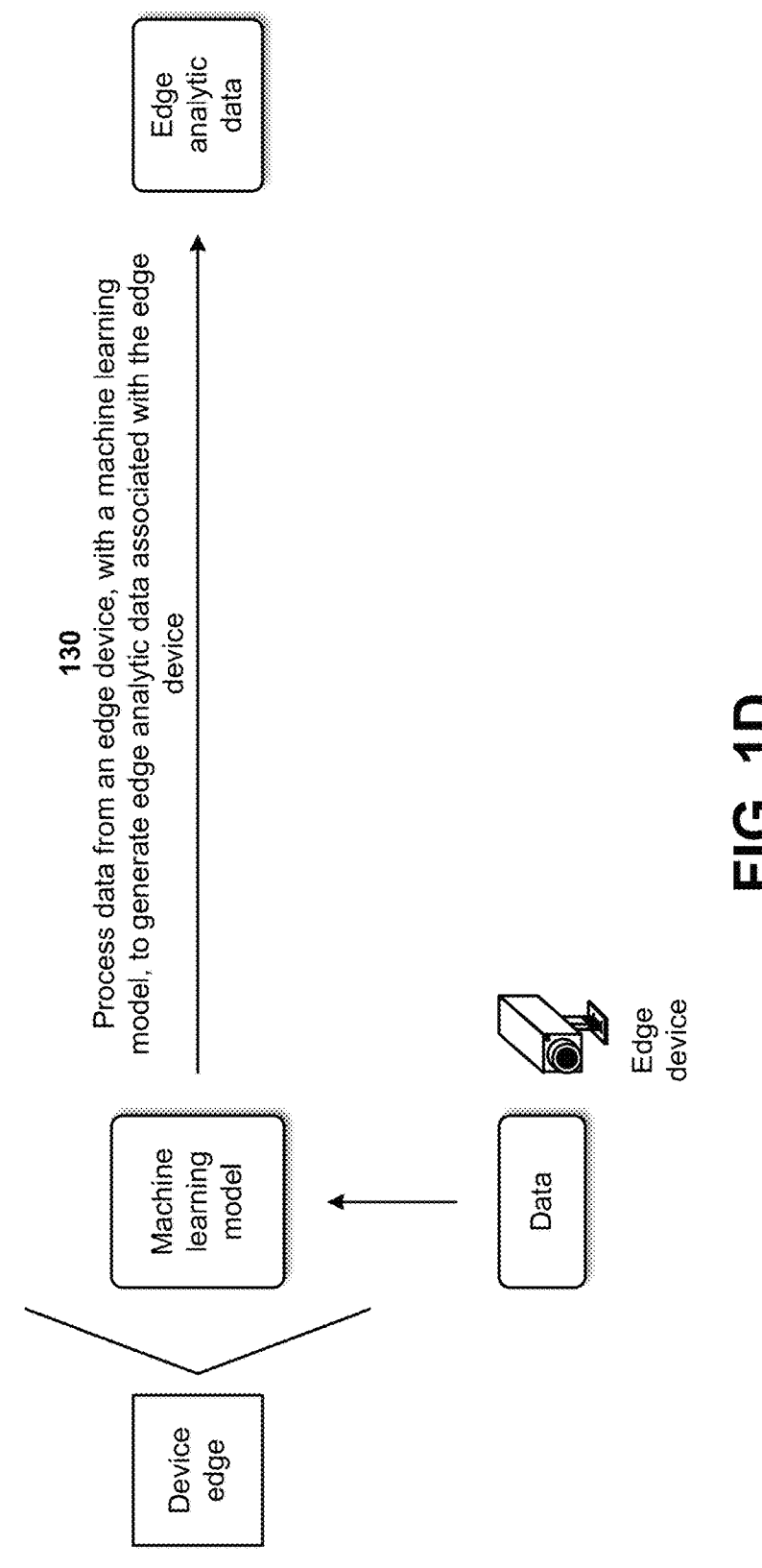

As shown in FIG. 1D, and by reference number 130, the device edge may process data from an edge device, with a machine learning model, to generate edge analytic data associated with the edge device. For example, the device edge may receive the machine learning model from the device edge controller, as described above in connection with FIG. 1A. The machine learning model may include a machine learning model that processes data from an edge device to generate edge analytic data associated with the edge device. The device edge may train the machine learning model to generate the edge analytic data associated with the edge device. In some implementations, rather than training the machine learning model, the device edge may obtain the machine learning model from another system or device (e.g., the device edge controller) that trained the machine learning model. In this case, the device edge may provide the other system or device with updated training, validation, and/or test datasets to retrain the machine learning model in order to update the machine learning model. In some implementations, the machine learning model may include a clustering model, as described above.

The device edge may receive the data from the edge device, and may process the data, with the machine learning model, to generate edge analytic data associated with the edge device. In some implementations, the analytic edge data associated with the edge device may include acceleration data, movement data, pressure data, sound data, vibration data, magnetic data, battery data, location data, temperature data, velocity data, weather data, and/or the like associated with the edge device. The edge analytic data may not include the raw (e.g., unprocessed) data provided by the edge device to the device edge. In this way, the device edge may provide security for the raw data received from the edge device by not transmitting the raw data to the device edge controller (e.g., via an insecure network).

In some implementations, the device edge may maintain only the edge analytic data that satisfies thresholds (e.g., a threshold acceleration, a threshold pressure, a threshold temperature, and/or the like) indicating a potential issue with the edge device, one or more devices of the core network, one or more devices of the RAN, and/or the like. The device edge may discard the edge analytic data that fails to satisfy the thresholds. In this way, the device edge may conserve processing resources, memory resources, and/or the like associated with the device edge. In some implementations, the device edge may continuously receive the data from the edge device, may periodically receive the data from the edge device, may receive the data from the edge device based on a request provided to the edge device, and/or the like.

Figure 1E:
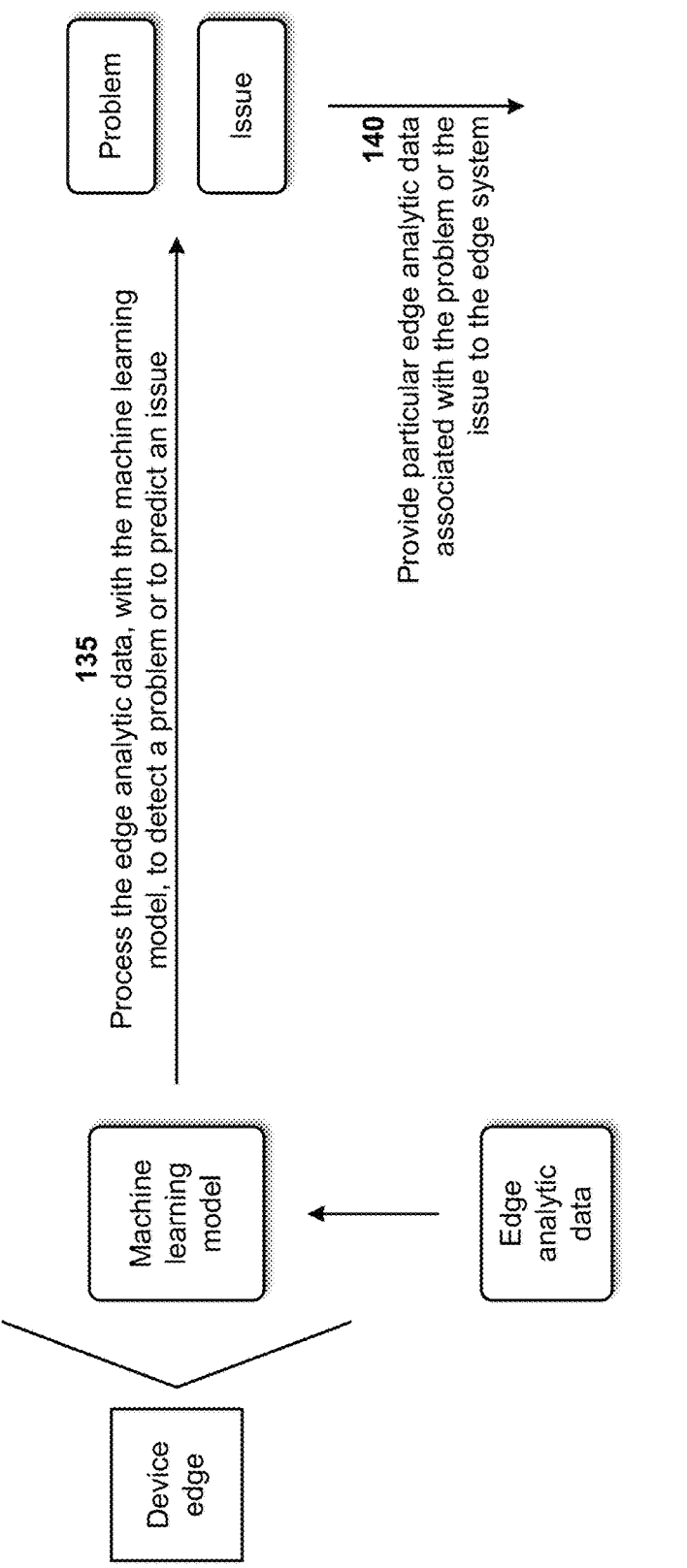

As shown in FIG. 1E, and by reference number 135, the device edge may process the edge analytic data, with the machine learning model, to detect a problem or to predict an issue. For example, the device edge may analyze the edge analytic data, and may detect the problem or predict the issue based on analyzing the edge analytic data. In some implementations, the device edge may process the edge analytic data, with the machine learning model, to detect the problem or to predict the issue with the edge device. The machine learning model may include a clustering model, as described above. In some implementations, the device edge may detect the problem or predict the issue with one or more devices of the core network and/or the RAN based on processing the edge analytic data with the machine learning model.

The device edge may monitor and detect the problem or the issue in real time and may provide proactive and predictive incident capabilities. For example, the device edge may detect movement of a cellular tower based on g-force and accurate azimuth, tilt, and roll data. The device edge may generate intelligent alarms for the problem or the issue and may provide real time automation and/or reactive inspection of the problem or the issue. The identification of the problem or the issue may enable the device edge to provide greater precision for inspection, maintenance and ultimately improvement and/or replacement of the edge device and/or the one or more devices of the core network and/or the RAN. The identification of the problem or the issue (e.g., via anomaly detection) may enable the device edge to proactively address the problem before more a severe incident occurs. For example, the device edge may cause power to be disabled for the edge device and/or the one or more devices of the core network and/or the RAN to prevent a severe incident and to improve safety.

As further shown in FIG. 1E, and by reference number 140, the device edge may provide particular edge analytic data associated with the problem or the issue to the device edge controller. For example, the device edge may provide, to the device edge controller, only the edge analytic data that satisfies the thresholds (e.g., the threshold acceleration, the threshold pressure, the threshold temperature, and/or the like) indicating the problem or the issue with the edge device, devices of the core network, devices of the RAN, and/or the like. The device edge may discard the edge analytic data not provided to the device edge controller. In this way, the device edges may reduce a quantity of traffic provided by the device edges, via the RAN, to the device edge controller, which conserves processing resources, memory resources, networking resources, and/or the like associated with the edge devices and the device edge controller.

As shown in FIG. 1F, and by reference number 145, the device edge may perform one or more actions based on the problem or the issue. In some implementations, performing the one or more actions includes the device edge changing a configuration or a parameter of the edge device based on the problem or the issue. For example, the device edge may identify a configuration or a parameter of the edge device that is causing the problem or the issue with the edge device. The device edge controller may generate a change for the configuration or the parameter, and may cause the edge device to implement the change for the configuration or the parameter in order to eliminate the problem or the issue. In this way, the device edge conserves computing resources, networking resources, and/or the like that would otherwise have been consumed in failing to identify problems or potential issues associated with the edge device, handling network outages caused by the problems or the potential issues, and/or the like.

In some implementations, performing the one or more actions includes the device edge changing a configuration or a parameter of a device associated with the edge device based on the problem or the issue. For example, the device edge may identify a configuration or a parameter of a device associated with the edge device (e.g., a device of the core network or the RAN) that is causing the problem or the issue. The device edge may generate a change for the configuration or the parameter, and may cause the device of the core network or the RAN to implement the change for the configuration or the parameter in order to eliminate the problem. In this way, the device edge conserves computing resources, networking resources, and/or the like that would otherwise have been consumed in troubleshooting the device based on problems or potential issues associated with the device, handling poor user experiences caused by the problems or the potential issues, and/or the like.

In some implementations, performing the one or more actions includes the device edge generating an alarm based on the problem or the issue. For example, the device edge may generate an alarm based on the problem or the issue, and may provide the alarm (e.g., via a text message, an email, a telephone call, a control system, and/or the like) to a party responsible for handling problems or issues associated with the edge device or one or more devices of the core network and/or the RAN. In this way, the device edge conserves computing resources, networking resources, and/ or the like that would otherwise have been consumed in failing to identify problems or potential issues associated with the edge device or the devices of the core network and/or the RAN, handling network outages caused by the problems or the potential issues, and/or the like.

In some implementations, performing the one or more actions includes the device edge retraining the machine learning model based on the problem or the issue. For example, the device edge may utilize the problem or the issue as additional training data for retraining the machine learning model, thereby increasing the quantity of training data available for training the machine learning model. Accordingly, the device edge may conserve computing resources associated with identifying, obtaining, and/or generating historical data for training the machine learning model relative to other systems for identifying, obtaining, and/or generating historical data for training machine learning models.

In some implementations, performing the one or more actions includes the device edge rebooting the edge device or a device associated with the edge device based on the problem or the issue. For example, the device edge may determine that the problem or the issue may be eliminated by rebooting the edge device or a device associated with the edge device (e.g., a device of the core network and/or the RAN). The device edge may cause the edge device or the device associated with the edge device to reboot in order to eliminate the problem. In this way, the device edge conserves computing resources, networking resources, and/or the like that would otherwise have been consumed in failing to identify problems or potential issues associated with the edge device or the device, handling network outages caused by the problems or the potential issues, and/or the like.

In some implementations, performing the one or more actions includes the device edge causing a technician or an autonomous device to be dispatched to service the edge device or a device associated with the edge device. For example, the device edge may determine that the problem with the edge device or the device associated with the edge device cannot be addressed by the device edge. In such situations, the device edge may cause a technician or an autonomous device to be dispatched to service the edge device or the device associated with the edge device. In this way, the device edge conserves computing resources, networking resources, and/or the like that would otherwise have been consumed in failing to identify problems or potential issues associated with the edge device or the device associated with the edge device, troubleshooting the edge device or the device associated with the edge device based on the problems or the potential issues, and/or the like.

In this way, the device edge utilizes a machine learning model to detect a problem or a potential issue associated with an edge device. The device edge may include a programmable, machine learning model-driven device that can be deployed across a geography (e.g., a network) to solve a variety of problems. The device edge may include 4G and 5G hardware that can be provided on or in a structure (e.g., an electric pole, a cell tower, and/or the like), an edge device (e.g., a transformer, a generator, and/or the like), an IoT device (e.g., a sensor, a robot, a meter, and/or the like), and/or the like. The device edge may include embedded software and cloud-based control mechanisms and may deploy new machine learning models. The device edge may utilize the machine learning model to detect problems at a structure, an edge device, an IoT device, and/or the like, and to predict potential issues (e.g., a physical failure of a structure) before the issues occur. This, in turn, conserves computing resources, networking resources, and/or the like that would otherwise have been consumed in failing to identify problems or potential issues associated with networks and/or devices of networks, handling network outages caused by the problems or the potential issues, troubleshooting the networks and/or the devices based on the problems or the potential issues, handling poor user experiences caused by the problems or the potential issues, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
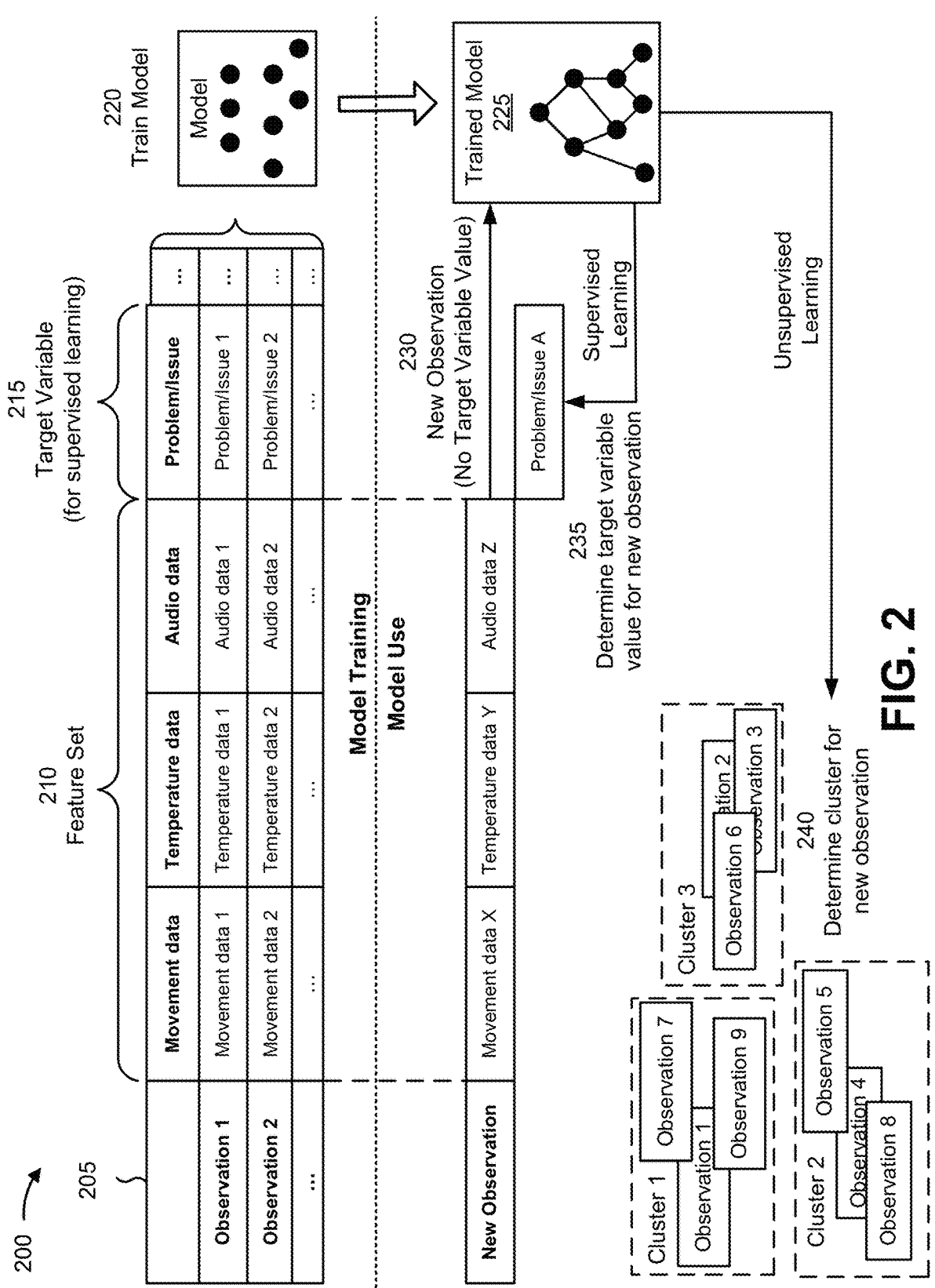
FIG. 2 is a diagram illustrating an example of training and using a machine learning model.

FIG. 2 is a diagram illustrating an example 200 of training and using a machine learning model in connection with detecting a problem or a potential issue associated with an edge device. The machine learning model training and usage described herein may be performed using a machine learning system. The machine learning system may include or may be included in a computing device, a server, a cloud computing environment, or the like, such as the device edge, described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the device edge, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the device edge. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of movement data, a second feature of temperature data, a third feature of audio data, and so on. As shown, for a first observation, the first feature may have a value of movement data 1, the second feature may have a value of temperature data 1, the third feature may have a value of audio data 1, and so on. These features and feature values are provided as examples, and may differ in other examples. For example, the feature set may include one or more of the following features: vibration data, tilt data, velocity data, pressure data, acceleration data, and/or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a problem or an issue, which has a value of problem/issue 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of movement data X, a second feature of temperature data Y, a third feature of audio data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of problem/issue A for the target variable of the problem or the issue for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a movement data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a temperature data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to detect a problem or a potential issue associated with an edge device. The machine learning system enables recognition and/or identification of tens, hundreds, thousands, or millions of features and/or feature values for tens, hundreds, thousands, or millions of observations, thereby increasing accuracy and consistency and reducing delay associated with detecting a problem or a potential issue associated with an edge device relative to requiring computing resources to be allocated for tens, hundreds, or thousands of operators to manually detect a problem or a potential issue associated with an edge device using the features or feature values.

As indicated above, FIG. 2 is provided as an example. Other examples may differ from what is described in connection with FIG. 2.

Figure 3:
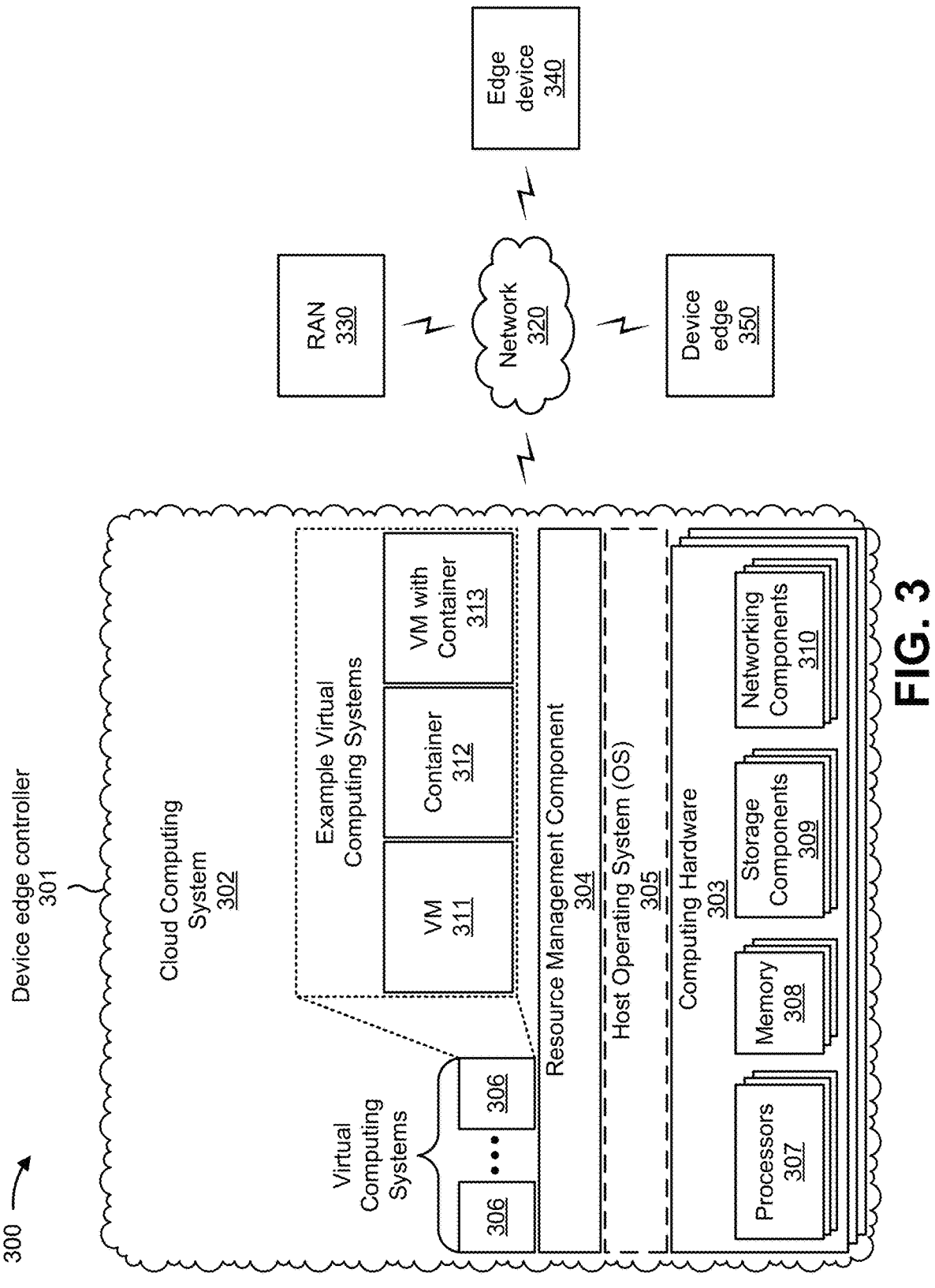
FIG. 3 is a diagram of an example environment in which systems and/or methods described herein may be imple-mented.

FIG. 3 is a diagram of an example environment 300 in which systems and/or methods described herein may be implemented. As shown in FIG. 3, the environment 300 may include a device edge controller 301, which may include one or more elements of and/or may execute within a cloud computing system 302. The cloud computing system 302 may include one or more elements 303-313, as described in more detail below. As further shown in FIG. 3, the environment 300 may include a network 320, a RAN 330, an edge device 340, and/or a device edge 350. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, the virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the device edge controller 301 may include one or more elements 303-313 of the cloud computing system 302, may execute within the cloud computing system 302, and/or may be hosted within the cloud computing system 302, in some implementations, the device edge controller

301 may not be cloud-based (e.g., may be implemented outside of a cloud computing system) or may be partially cloud-based. For example, the device edge controller 301 may include one or more devices that are not part of the cloud computing system 302, such as a device 400 of FIG. 4, which may include a standalone server or another type of computing device. The device edge controller 301 may perform one or more operations and/or processes described in more detail elsewhere herein.

The network 320 may include one or more wired and/or wireless networks. For example, the network 320 may include a cellular network (e.g., a 5G network, a 4G network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 320 enables communication among the devices of environment 300.

The RAN 330 may support, for example, a cellular radio access technology (RAT). The RAN 330 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the edge device 340. The RAN 330 may transfer traffic between the edge device 340 (e.g., using a cellular RAT), one or more base stations (e.g., using a wireless interface or a backhaul interface, such as a wired backhaul interface), and/or a core network. The RAN 330 may provide one or more cells that cover geographic areas.

The edge device 340 includes one or more devices capable of receiving, generating, storing, processing, and/or providing information, as described elsewhere herein. The edge device 340 may include a communication device and/or a computing device. For example, the edge device 340 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), an IoT device, or a similar type of device.

The device edge 350 includes one or more devices capable of receiving, generating, storing, processing, and/or providing information, as described elsewhere herein. The device edge 350 may include a communication device and/or a computing device. For example, the device edge 350 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the device edge 350 may include 4G and 5G hardware that can be provided on or in a structure (e.g., an electric pole, a cell tower, and/or the like), the edge device 340 (e.g., a transformer, a generator, and/or the like), an IoT device (e.g., a sensor, a robot, a meter, and/or the like), and/or the like. In some implementations the device edge 350 may include one or more of the components described above in connection with FIG. 1C.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
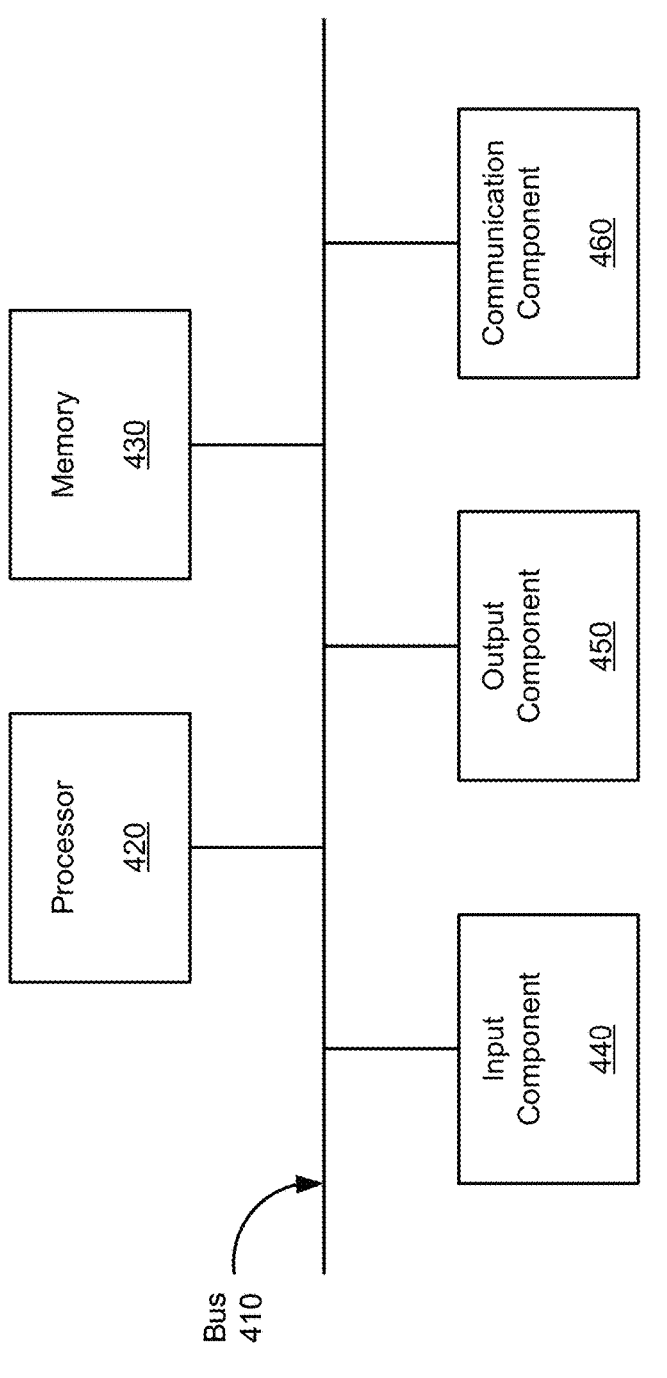
FIG. 4 is a diagram of example components of one or more devices of FIG. 3.

FIG. 4 is a diagram of example components of a device 400, which may correspond to the device edge controller 301, the RAN 330, the edge device 340, and/or the device edge 350. In some implementations, the device edge controller 301, the RAN 330, the edge device 340, and/or the device edge 350 may include one or more devices 400 and/or one or more components of the device 400. As shown in FIG. 4, the device 400 may include a bus 410, a processor 420, a memory 430, an input component 440, an output component 450, and a communication interface 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication interface 460 enables the device 400 to communicate with other devices via a wired connection and/or a wireless connection. For example, the communication interface 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for utilizing a device edge with a machine learning model to detect a problem or a potential issue associated with an edge device. In some implementations, one or more process blocks of FIG. 5 may be performed by a device (e.g., the device edge 350). In some implementations, one or more process blocks of FIG. 5 may be performed by another device or a group of devices separate from or including the device, such as a device edge controller (e.g., the device edge controller 301) and/or an edge device (e.g., the edge device 340). Additionally, or alternatively, one or more process blocks of FIG. 5 may be performed by one or more components of the device 400, such as the processor 420, the memory 430, the input component 440, the output component 450, and/or the communication interface 460.

As shown in FIG. 5, process 500 may include receiving a machine learning model (block 510). For example, the device may receive a machine learning model, as described above. In some implementations, the machine learning model is trained to generate edge analytic data associated with edge devices and to detect problems or to predict issues associated with the edge devices or RAN devices associated with the edge devices.

As further shown in FIG. 5, process 500 may include receiving data from an edge device associated with a RAN (block 520). For example, the device may receive data from an edge device associated with a RAN, as described above. In some implementations, the device is included in or physically attached to the edge device. In some implementations, the device includes one or more of a modem, an accelerometer, a gyroscope, a pressure sensor, a sound sensor, a vibration sensor, a magnetometer, a battery, a solar charger, a Bluetooth component, a radar component, a temperature sensor, a velocity sensor, a battery monitor, or a camera.

As further shown in FIG. 5, process 500 may include processing the data, with the machine learning model, to generate edge analytic data associated with the edge device (block 530). For example, the device may process the data, with the machine learning model, to generate edge analytic data associated with the edge device, as described above.

As further shown in FIG. 5, process 500 may include processing the edge analytic data, with the machine learning model, to detect a problem or to predict an issue associated with the edge device or a RAN device associated with the edge device (block 540). For example, the device may process the edge analytic data, with the machine learning model, to detect a problem or to predict an issue associated with the edge device or a RAN device associated with the edge device, as described above. In some implementations, the device is included in or physically attached to the RAN device.

As further shown in FIG. 5, process 500 may include providing particular edge analytic data associated with the problem or the issue to a cloud-computing system (block 550). For example, the device may provide particular edge analytic data associated with the problem or the issue to a cloud-computing system, as described above.

As further shown in FIG. 5, process 500 may include performing one or more actions based on the problem or the issue associated with the edge device or the RAN device (block 560). For example, the device may perform one or more actions based on the problem or the issue associated with the edge device or the RAN device, as described above. In some implementations, performing the one or more actions includes one or more of changing a configuration or a parameter of the edge device based on the problem or the issue, or changing a configuration or a parameter of the RAN device associated with the edge device based on the problem or the issue. In some implementations, performing the one or more actions includes one or more of generating an alarm based on the problem or the issue, or retraining the machine learning model based on the problem or the issue.

In some implementations, performing the one or more actions includes one or more of rebooting the edge device or the RAN device associated with the edge device based on the problem or the issue, or causing a technician or an autonomous device to be dispatched to service the edge device or the RAN device associated with the edge device. In some implementations, performing the one or more actions includes one or more of powering off the RAN device associated with the edge device based on the problem or the issue, or causing a replacement edge device to be ordered based on the problem or the issue.

In some implementations, performing the one or more actions includes receiving, from the cloud-computing system, an instruction to change a configuration or a parameter of the edge device or the RAN device, and changing the configuration or the parameter of the edge device or the RAN device based on the instruction. In some implementations, performing the one or more actions includes receiving, from the cloud-computing system, an instruction to reboot the edge device or the RAN device, and rebooting the edge device or the RAN device based on the instruction.

In some implementations, process 500 includes deleting particular edge analytic data unassociated with the problem or the issue. In some implementations, process 500 includes training the machine learning model prior to processing the data with the machine learning model.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
    receiving, by a device, a machine learning model;

receiving, by the device, data from an edge device associated with a radio access network (RAN);

processing, by the device, the data, with the machine learning model, to generate edge analytic data associated with the edge device;

processing, by the device, the edge analytic data, with the machine learning model, to detect a problem or to predict an issue associated with the edge device or a RAN device associated with the edge device;

providing, by the device, first particular edge analytic data associated with the problem or the issue to a cloud-computing system;

deleting, by the device, second particular edge analytic data unassociated with the problem or the issue; and performing, by the device, one or more actions based on the problem or the issue associated with the edge device or the RAN device.

2. The method of claim 1, wherein the device is included in or physically attached to the edge device.

3. The method of claim 1, wherein the device includes one or more of:

a modem, an accelerometer, a gyroscope, a pressure sensor, a sound sensor, a vibration sensor, a magnetometer, a battery, a solar charger, a Bluetooth component, a radar component, a temperature sensor, a velocity sensor, a battery monitor, or a camera.

4. The method of claim 1, further comprising:

training the machine learning model prior to processing the data with the machine learning model.

5. The method of claim 1, wherein performing the one or more actions comprises one or more of:

changing a configuration or a parameter of the edge device based on the problem or the issue; or changing a configuration or a parameter of the RAN device associated with the edge device based on the problem or the issue.

6. The method of claim 1, wherein performing the one or more actions comprises one or more of:

generating an alarm based on the problem or the issue; or retraining the machine learning model based on the problem or the issue.

7. A device, comprising:

one or more memories; and one or more processors, coupled to the one or more memories, configured to:

receive data from an edge device associated with a radio access network (RAN);

process the data, with a machine learning model, to generate edge analytic data associated with the edge device;

process the edge analytic data, with the machine learning model, to detect a problem or to predict an issue associated with the edge device or a RAN device associated with the edge device;

provide first particular edge analytic data associated with the problem or the issue to a cloud-computing system;

delete second particular edge analytic data unassociated with the problem or the issue; and perform one or more actions based on the problem or the issue associated with the edge device or the RAN device.

8. The device of claim 7, wherein the one or more processors, to perform the one or more actions, are configured to one or more of:

reboot the edge device or the RAN device associated with the edge device based on the problem or the issue; or cause a technician or an autonomous device to be dispatched to service the edge device or the RAN device associated with the edge device.

9. The device of claim 7, wherein the machine learning model is trained to generate edge analytic data associated with edge devices and to detect problems or to predict issues associated with the edge devices or RAN devices associated with the edge devices.

10. The device of claim 7, wherein the one or more processors, to perform the one or more actions, are configured to one or more of:

power off the RAN device associated with the edge device based on the problem or the issue; or cause a replacement edge device to be ordered based on the problem or the issue.

11. The device of claim 7, wherein the device is included in or physically attached to the RAN device.

12. The device of claim 7, wherein the one or more processors, to perform the one or more actions, are configured to:

receive, from the cloud-computing system, an instruction to change a configuration or a parameter of the edge device or the RAN device; and change the configuration or the parameter of the edge device or the RAN device based on the instruction.

13. The device of claim 7, wherein the one or more processors, to perform the one or more actions, are configured to:

receive, from the cloud-computing system, an instruction to reboot the edge device or the RAN device; and reboot the edge device or the RAN device based on the instruction.

14. A non-transitory computer-readable medium storing a set of instructions, the set of instructions comprising:

one or more instructions that, when executed by one or more processors of a device, cause the device to:

receive a machine learning model;

receive data from an edge device associated with a radio access network (RAN);

process the data, with the machine learning model, to generate edge analytic data associated with the edge device;

process the edge analytic data, with the machine learning model, to detect a problem or to predict an issue associated with the edge device or a RAN device associated with the edge device;

provide particular edge analytic data associated with the problem or the issue to a cloud-computing system;

delete particular edge analytic data unassociated with the problem or the issue; and perform one or more actions based on the problem or the issue associated with the edge device or the RAN device.

15. The non-transitory computer-readable medium of claim 14, wherein the device is included in or physically attached to the edge device or the RAN device.

16. The non-transitory computer-readable medium of claim 14, wherein the one or more instructions further cause the device to:

train the machine learning model prior to processing the data with the machine learning model.

17. The non-transitory computer-readable medium of claim 14, wherein the one or more instructions, that cause the device to perform the one or more actions, cause the device to or more of:

change a configuration or a parameter of the edge device based on the problem or the issue;

change a configuration or a parameter of the RAN device associated with the edge device based on the problem or the issue;

generate an alarm based on the problem or the issue; or retrain the machine learning model based on the problem or the issue.

18. The non-transitory computer-readable medium of claim 14, wherein the one or more instructions, that cause the device to perform the one or more actions, cause the device to one or more of:

reboot the edge device or the RAN device associated with the edge device based on the problem or the issue;

cause a technician or an autonomous device to be dispatched to service the edge device or the RAN device associated with the edge device;

power off the RAN device associated with the edge device based on the problem or the issue; or cause a replacement edge device to be ordered based on the problem or the issue.

19. The non-transitory computer-readable medium of claim 14, wherein the one or more instructions, that cause the device to perform the one or more actions, cause the device to:

receive, from the cloud-computing system, an instruction to change a configuration or a parameter of the edge device or the RAN device; and change the configuration or the parameter of the edge device or the RAN device based on the instruction.

20. The method of claim 1, wherein the first particular edge analytic data is provided to the cloud-computing system based on the first particular edge analytic data satisfying one or more thresholds associated with indicating the problem or the issue.

* * * * *